US011493614B2

(12) United States Patent
Gong et al.

(10) Patent No.: US 11,493,614 B2
(45) Date of Patent: Nov. 8, 2022

(54) METHOD AND DEVICE FOR MEASURING A DISTANCE TO A TARGET IN A MULTI-USER ENVIRONMENT USING AT LEAST TWO WAVELENGTHS

(71) Applicant: FASTREE3D SA, Ecublens (CH)

(72) Inventors: Ting Gong, Delft (NL); Stefan Keller, Le Mont-sur-Lausanne (CH); Lucio Carrara, Lausanne (CH)

(73) Assignee: FASTREE3D SA, Ecublens (CH)

( * ) Notice: Subject to any disclaimer, the term of this patent is extended or adjusted under 35 U.S.C. 154(b) by 803 days.

(21) Appl. No.: 16/345,663

(22) PCT Filed: Nov. 1, 2016

(86) PCT No.: PCT/EP2016/076300
§ 371 (c)(1),
(2) Date: Apr. 26, 2019

(87) PCT Pub. No.: WO2018/082762
PCT Pub. Date: May 11, 2018

(65) Prior Publication Data
US 2021/0149028 A1    May 20, 2021

(51) Int. Cl.
*G01S 7/00* (2006.01)
*G01S 7/4865* (2020.01)
(Continued)

(52) U.S. Cl.
CPC .......... *G01S 7/4865* (2013.01); *G01S 7/4815* (2013.01); *G01S 7/4861* (2013.01); *G01S 17/10* (2013.01)

(58) Field of Classification Search
USPC ........................................... 356/5.01
See application file for complete search history.

(56) References Cited

U.S. PATENT DOCUMENTS

| 3,942,890 A | 3/1976 | Malone |
| 4,315,609 A | 2/1982 | McLean |

(Continued)

FOREIGN PATENT DOCUMENTS

| DE | 41 41 468 A1 | 6/1993 | |
| DE | 4141468 A1 * | 6/1993 | ........... G01S 17/026 |

(Continued)

OTHER PUBLICATIONS

International Search Report and Written Opinion dated Aug. 3, 2017, issued in corresponding International Application No. PCT/EP2016/076300, filed Nov. 1, 2016, 12 pages.

(Continued)

*Primary Examiner* — James R Hulka
(74) *Attorney, Agent, or Firm* — Christensen O'Connor Johnson Kindness PLLC

(57) ABSTRACT

A method for measuring a distance to a target in a multi-user environment, comprising: irradiating the environment by a series of light pulses, wherein this series of light pulses is emitted by a battery of at least two or a single light source device emitting on at least two different wavelengths, the light pulses being emitted at a determined repetition rate and with a determined randomly selected wavelength; collecting pulses reflected or scattered from the environment to at least one detector equipped with a wavelength filter whose pass band corresponds to the selected emitted wavelength; assigning a timestamp at the detection of a pulse by at least one chronometer connected to the detector, said timestamps corresponding to the time of arrival (TOA); determining the statistical distribution of said time of arrivals; determining the distance to the target from said statistical distribution.

16 Claims, 7 Drawing Sheets

(51) Int. Cl.
*G01S 7/481* (2006.01)
*G01S 7/4861* (2020.01)
*G01S 17/10* (2020.01)

(56) References Cited

U.S. PATENT DOCUMENTS

| | | | |
|---|---|---|---|
| 4,717,917 A | 1/1988 | Alitz | |
| 7,683,825 B2 | 3/2010 | Sun | |
| 8,384,883 B2 * | 2/2013 | Heizmann | G01S 7/484 356/5.01 |
| 9,091,754 B2 * | 7/2015 | d'Aligny | G01S 7/484 |
| 10,139,491 B2 * | 11/2018 | Takasuka | G01S 7/4804 |
| 11,320,514 B2 | 5/2022 | Keller | |
| 2008/0024355 A1 | 1/2008 | Sun | |
| 2010/0102203 A1 | 4/2010 | Grund | |
| 2010/0128246 A1 * | 5/2010 | Heizmann | G01S 7/484 356/5.01 |
| 2011/0316747 A1 | 12/2011 | Budianu | |
| 2013/0050676 A1 | 2/2013 | d'Aligny | |
| 2016/0033644 A1 | 2/2016 | Moore | |
| 2016/0069998 A1 | 3/2016 | Takasuka et al. | |
| 2017/0016981 A1 | 1/2017 | Hinderling | |
| 2017/0188192 A1 | 6/2017 | Mujtaba | |
| 2018/0063811 A1 | 3/2018 | Richley | |
| 2020/0150229 A1 | 5/2020 | Magnani | |

FOREIGN PATENT DOCUMENTS

| | | | | |
|---|---|---|---|---|
| EP | 0 654 682 B1 | | 5/1995 | |
| EP | 2 189 805 A1 | | 5/2010 | |
| EP | 2189805 A1 | * | 5/2010 | ............ G01S 17/10 |
| EP | 2 469 295 A1 | | 6/2012 | |
| WO | 2006/049643 A2 | | 5/2006 | |

OTHER PUBLICATIONS

International Search Report and Written Opinion dated May 11, 2017, issued in International Application No. PCT/EP2016/069271, filed Aug. 12, 2016, 8 pages.

* cited by examiner

METHOD AND DEVICE FOR MEASURING A DISTANCE TO A TARGET IN A MULTI-USER ENVIRONMENT USING AT LEAST TWO WAVELENGTHS

TECHNICAL FIELD

The present invention relates to a method and a device for detecting distances by the means of sending out a signal of light, with em-radiation of frequencies ≥1 THz, into the observed environment and recording the time-of-flight (TOF) needed for said signal to bounce off a target and echo back. Such a TOF system is usually called lidar according to the acronym "Light Detection And Ranging and also known as ladar standing for laser radar.

More specifically the present invention addresses the problem such time-of-flight systems encounter when multiple systems of similar construction are present in the same environment: these systems typically interfere with each other and end up corrupting the TOF detection of one another.

PRIOR ART

Time-of-flight (TOF) systems are well known, working with either acoustic waves (called sonar; SOund Navigation And Ranging), or electro-magnetic (em) waves emitting in the radio or microwave frequency range (called radar; RAdio Detection And Ranging; typically referring to em-radiation of frequencies <1 THz), or em waves emitting in the optical frequency range (called lidar; Light Detection And Ranging; typically referring to em-radiation of frequencies ≥1 THz, those frequencies then usually referred to by its reciprocal representation called wavelength).

A time-of-flight (TOF) system emits a type of radiation onto a probed target and detects the reflected echo. By estimating the time this said radiation needed to return, and by assuming the propagation speed (c) of the considered radiation as constant and known, the distance to the target can be inferred. The radiation is typically of either acoustic or electro-magnetic (em) nature.

There are two distinct approaches to time-of-flight (TOF): they are called the direct and the indirect approach.

In direct time-of-flight (d-TOF) the system emits the radiation in form of a pulse, and measures directly the time starting from this emission until the echo returns. This time difference corresponds to the time-of-flight (TOF) that the emitted radiation needed to reach—what is usually called—the target, and to return. FIG. 1 illustrates this concept. In direct time-of-flight the distance (D) between TOF-system and target is computed as D=cTOF/2; with c being the propagation speed of the considered radiation in the considered medium.

A pulse of radiation can be identified as such based on for example the radiation amplitude exceeding a set threshold value in the time domain, or reciprocally, the radiation exceeding a certain value in the frequency domain. Detecting on exceeding a certain value is typically referred to as detecting the leading or rising edge; detecting on underrunning a value is typically referred to as detecting the trailing or falling edge. Apart from such threshold detections also other detection methods are possible, such as detecting a certain pulse shape—pulse again understood as realized in time or frequency domain, respectively. Examples of such pulses are given in Szajnowski et al. U.S. Pat. No. 8,031,106 and Rieger et al. US20120257186 for instance.

In indirect time-of-flight (i-TOF) the system emits a modulated radiation, and estimates the distance between system and target through the phase shift (φ) between the modulated emission and detected echo. For example, the emission could be of the form sin(2πf), and the detection of the form sin(2πf+φ). The distance is then estimated as $$D = \frac{c}{2}\frac{\phi}{2\pi f}.$$

This modulation can be realized with any arbitrary combination of radiation parameters, such as amplitude modulation, frequency modulation, and phase modulation.

Square wave modulation is often used as a crude approximation of the sine modulation as illustrated in FIG. 2. In a square wave modulation pulses are emitted, where the pulse indicates the high state (peak) of the equivalent sine and the off stage between the pulses represent the low state (trough) of the sine. A square wave modulation is preferred in some cases because it can be implemented using simple digital circuits. Whether pulsed or continuously modulated, the underlying measurement principle is the same: a phase difference is estimated and from there the distance deduced from it.

A different approach of i-TOF using square wave modulation is employed by Kim et al. in U.S. Pat. No. 8,217,327: they modulate using a short and a long pulse during an overlapping time interval. These two pulses add up such that the emitted pulse shows an asymmetry in amplitude. The detector accumulates a charge based on the amplitude of the detected light. Because of the asymmetry in the effectively emitted pulse, also the charge detection shows an asymmetry. By reading out the accumulated charge at a predefined phase difference the distance can be deduced similar to methods that determine phase difference φ, but by avoiding the demodulation.

The presence of several of such TOF systems in the same environment—most noticeably when they are facing the same direction—may interfere with the individual measurements. For example a pulse can be detected that was emitted by a second system. This interference can lead to the detection of wrong distances. Detecting the wrong distance can be dangerous for example if the TOF system is supposed to observe the environment around an automated guided vehicle. This problem is known under various names such as multi-camera, multi-user, inter-system interference, and crosstalk scenario.

The multi-user environment is well known in the art and some solutions are proposed. Nonetheless, these methods have several short comings. In general these methods can be characterized as either a form of (time-)multiplexing or encoded communication.

In time-multiplexing, the participating systems are active during different time slots. As a consequence the different systems cannot be disturbed by one another. One way to achieve this is to let the different participating systems to communicate on a separate channel by means of a central coordination unit. On such a separate channel the systems can negotiate which of them can use what time slot. Otherwise, in a controlled environment, no live negotiation is necessary, and the time slots can be assigned offline. This type of time-multiplexing is stated for example in Gilliland et al. US2014340487. The disadvantage in requiring a central coordination unit are increased costs and needed effort to install a multi-user environment. On top of that, it also decreases the maximum possible number of participating systems, as with each additional one the usable time slots get smaller, because the total available time stays constant.

Time-multiplexing relies on that either the environment is fixed and controlled, or that at least all TOF systems which enter the environment cooperate with the already present systems. It is potentially dangerous to rely on the cooperation of foreign systems, as for example different manufacturers could use different protocols. Even if an industry wide standard is agreed upon, previous generation systems, or intentionally malicious participants, can jeopardize the multi-user environment.

Another strategy of time-multiplexing that doesn't rely on the cooperation of third party TOF systems is disclosed in Herschbach et al. WO2013127973: they propose to irradiate and detect at random intervals. The smaller the duty-cycle of the individual TOF device, the higher the likelihood that no second TOF device is currently irradiating the environment.

The accuracy of an estimated TOF value is typically improved for longer acquisition times because the signal-to-noise ratio (SNR) usually improves as more measurement samples are taken into account. This fact counteracts the desired shortening of the acquisition window; i.e. the small duty-cycle just mentioned, in order to address more and more participating systems with random detection intervals.

When the time slots for detecting are chosen randomly, there is a certain probability that two or more systems are active at the same time. This time slot collision probability increases with the number of participating systems. Hence, at any given time an unknown amount of TOF systems are probing the environment.

On the other hand, while the number of active secondary systems is not known, it could be assumed that during every measurement different systems are probing. These secondary systems are expected to pollute the measurement, by effecting wrong measurement values from time to time. However, by postprocessing the N last measurements the correct TOF value could be filtered out. This is in line with for example the proposal by Li et al., "Multi-camera interference cancellation of time-of-flight (TOF) cameras" ICIP, conference (2015), doi: 10.1109/ICIP.2015.7350860.

The inherent problem to such postprocessing solutions is the added latency: an accurate value can be reported only after N measurements. Typically, this is an undesired property in applications that rely on real time data, such as for example in automotive. Furthermore, if the probed target moves during these N measurements, i.e. the real distance is not the same for all those N single measurements, the postprocessing unit has to overcome additional difficulties.

Analogous to time-multiplexing other types of multiplexing, like frequency-multiplexing (in lidar frequency is commonly referred to by its reciprocal quantity wavelength) can be thought of; this is known, for example, as wavelength division multiplexing (WDMA).

In reality, the possibilities of such frequency/wavelength-multiplexing strategies are, however, very limited for a multi-user environment. For one, a TOF system irradiates into free space. The allowed frequencies to use for radar are highly regulated. On the other hand, lidar systems would have considerably more regulatory freedom, but realistic wavelength band pass filter widths limit the available number of options considerably.

For example, if one wants to use a detector based on silicon one has to consider the substrate to become transparent for wavelengths $\lambda > 1.1$ μm. If the system is furthermore supposed to irradiate in the invisible range, the available spectrum shrinks down to be realistically between 800 nm $\leq \lambda \leq$ 1000 nm. If one considers a band pass filter of 10 nm width there are 20 wavelengths left. If such a product line was used on a car and four such cars were facing each other on a cross road, the probability that at least two of them emit at the same wavelength is >27%. The risk for such a constellation to occur is typically too high and the approach hence not usable.

Besides, lidar systems typically employ light sources with a predetermined wavelength; preferably with a narrow spectrum. With such devices it is difficult to tune the wavelength beyond the given spectrum. A corresponding product line would need to have several versions assembled with different light sources. Alternatively, every device of such a product line would have to be equipped with multiple lasers of various wavelengths and several different filters on detection side. In this latter option a central coordination unit oversighting the multi-user environment could assign appropriate wavelengths. Eitherway, these options are expensive, impractical, and vulnerable against malicious participants.

In another category, there are several proposals to deal with multi-user interference by adopting strategies known from communication theory. The idea is usually to encode a random, pseudo-random, or a chaotic pattern in at least one arbitrary parameter of the emission. On detection side a filter is applied to let through only the matching pattern. The idea behind these patterns is that the emission from a foreign source, e.g. from a secondary TOF system, cannot be distinguished from background contributions. This principle is known under the term pseudo-noise modulation.

With this pseudo-noise modulation it is possible that one system exchanges a modulation pattern between emission and detection that does not match the same pattern of a second system. Instances of such patterns are given, among others, in for example Griep et al. "Poly-Phase Codes and Optimal Filters for Multiple User Ranging," IEEE Trans. Aerospace and Eelctr. Sys., 31(2), 1995, doi: 10.1109/7.381922 and Rieger et al. "Range ambiguity resolution technique applying pulse-position modulation in time-of-flight scanning lidar applications," Opt. Eng. 53(6), 2014, doi: 10.1117/1.OE.53.6.061614 (or Rieger et al. US2012257186 correspondingly).

Random patterns can be generated by employing physical randomness, as found for example in a coin toss, or thermal jitter, or radioactive decay. Real random numbers are often not desired as they are not controllable and can bring in unfortunate dependencies and correlations.

A pseudo-random pattern is created with a deterministic algorithm but in such a way that they look random; meaning, when investigating their mathematical properties with tests such as n-cube-test, $\chi^2$-test, spectral test, etc. a pseudo-random patterns cannot be distinguished from real-random patterns.

An often used implementation of pseudo noise (de-)modulation is the so-called maximum length sequence, or m-sequence for short. These m-sequences can be interpreted as a generalization of the square wave modulation mentioned above: square pulses are emitted with, for example, varying durations of high and low state. The auto-correlation of the whole sequence is a triangle function, approximating a Kronecker-delta function.

The base of this triangle is system design specific, and the corresponding time delay called chip time Tc: If the absolute measured delay is less than one chip time, the demodulator samples the autocorrelation function on one of the two sides of the triangle; from which a phase shift, and thus distance, can be determined. If the delay, however, is more than one chip time, the demodulator samples the autocorrelation function outside the triangle, where it is identical to zero. Foreign sequences are also demodulated to zero, after probing the whole sequence—this is the definition of the Kronecker-delta property—such that multiple systems can be present in the same environment, each of which detects a position within the triangle plus the zero contributions of the others, which thus do not interfere with the measurement; at least in theory.

In reality, m-sequences have several short comings in a multi-user environment. First of all, these TOF systems need to detect the entire m-sequence. The Kronecker-delta property is given for the whole sequence, the autocorrelation of subsequences is not guaranteed to be zero. The more participating devices are to be expected, the longer does the sequence need to be to ensure the advantageous auto- and cross-correlation properties. A long sequence represents a long measurement, and thus a slow system.

Secondly, the full sequence needs to be detected with little margin for error. If some of the bits are missed, because the target is at a large distance or weakly reflective for example, the auto-correlation doesn't match and the detected sequence is discarded as noise. Relatively few missed pulses can mean the whole m-sequence needs to be probed again.

Thirdly, the Kronecker-delta property is true only if the whole m-sequence is considered. This means especially, if two TOF systems work with sequences of different lengths, the longer sequence can lead to a non-zero demodulation result in the short sequence system, which would subsequently be interpreted as a phase shift and distance. This last point is particularly detrimental in non-cooperative multi-user environments.

As mentioned above, any emission parameter can be modulated with pseudo-noise. Bamij et al. U.S. Pat. No. 7,405,812 proposed a i-TOF system in which they incorporate the pseudo-noise modulation on the emitted frequency (so-called frequency hopping): the demodulation favors to detect a signal whose modulation frequency correlates to the emitted one. Varying this frequency (pseudo) randomly reduces the likelihood that a secondary TOF system emits the same radiation at any given time. In Hu et al. "Correlation Property Analysis for the Pulse Position Modulation Sequence used for Non-Crosstalk Sonar Systems," IEEE CISP, Volume 5, 2011, doi: 10.1109/CISP.2011.6100772 (2011), Meng et al. "Frequency-Hopping Pseudo-Random Pulse Width Modulation to Eliminate Crosstalk of Sonar Sensors in Mobile Robots," IEEE IROS, conference, 2006, doi: 10.1109/IROS.2006.281690 (2005), and Buettigen et al. US20110299059 the modulated parameters are the pulse width or position. In Oggier et al. EP2594959 they modulate the phase (phase hopping). In Szajnowski et al. U.S. Pat. No. 8,031,106 the pseudo-noise is encoded in high-frequency state, low-frequency state, and the two transitions in between.

Pseudo-noise patterns generated by the means of pseudo-random number generators (RNG) repeat themselves after a certain sequence length. Some systems rely on this repetition, such as the above described m-sequence. For many other applications, however, this poses an undesired vulnerability. To avoid the repetition the emitted pulse pattern can be mixed with the detected pattern in a feedback loop as for example declared in Wohlenberg et al. DE20131002651. Another way to avoid the repetition is to generate the pseudo-noise with a chaos generator instead of an RNG as disclosed in Sushchik et al. "Chaotic Pulse Position Modulation: A Robust Method of Communicating with Chaos," IEEE Com. Lett. 4(4), 2000, doi: 10.1109/4234.841319, Rulkov et al. "Digital Communication Using Chaotic-Pulse-Position Modulation," IEEE Trans. on Circ. and Sys. I, 48(2), 2001, doi: 10.1109/TCSI.2001.972850, and Fortuna et al. "Chaotic Pulse Position Modulation to Improve the Efficiency of Sonar Sensors," IEEE Trans. Instr. Meas., 52(6), 2003, doi: 10.1109/TIM.2003.820452 who went on to protect their invention as disclosed in U.S. Pat. No. 6,738,313B2. Chaotic systems are still deterministic systems, in principle, but they depend heavily on the exact initial conditions, which makes them unpredictable, and which is in some cases not desirable.

Most of the above cited solutions refer to i-TOF implementations. The basic ideas could also be ported to d-TOF systems. In Rieger et al. US20120257186 for example they employ pseudo-noise to overcome the round-trip ambiguity of a d-TOF system: instead of measuring the TOF of single pulses, they propose to measure the TOF of pulse sequences. By assigning every participant with such a randomly looking identifier code, the principle could be directly ported to multi-user environments. Such an approach is for example discussed in Griep et al. "Poly-Phase Codes and Optimal Filters for Multiple User Ranging," IEEE Trans. Aerospace and Eelctr. Sys., 31(2), 1995, doi: 10.1109/7.381922.

The solutions derived from communication theory rely on relatively long sequences. This way they increase the likelihood that the identification pattern is unique. However, as the TOF system needs to detect the identifier sequence, estimating the TOF value is typically slow; in particular for m-sequences as was elaborated on above. Secondly, when the emitted—and the detected—pulse patterns need to be stored in memory, before they can be processed and compared, lengthly sequences represent a clear drawback: for a TOF system based on a multitude of receivers (e.g. an array) this is a costly hardware constraint. Third, in a solution similar to the proposal by Rieger et al. "Range ambiguity resolution technique applying pulse-position modulation in time-of-flight scanning lidar applications," Opt. Eng. 53(6), 2014, doi: 10.1117/1.OE.53.6.061614 the matched filter relies on the assumption that "each laser emission results in one single laser echo". Or, in other words, per emitted pulse only one pulse echo is allowed to be recorded; either the echo of a transmitted pulse, or a secondary pulse. In a multi-user environment this assumption cannot be made—except in the case of time-multiplexing, but in such a case pseudo-noise encoding wouldn't be necessary.

Beside the assumption to get not more than one echo, it is also required to detect not less than one pulse echo. Some detectors, such as for example single-photon avalanche diodes (SPADs), show a dead time after detecting an (in this case, single photon) echo. In general, a dead time can be understood as a time interval during which the detector cannot detect, so that some echoes are missed (wrong negatives), or because the detection read-out is busy while transmitting the detection event, or again with the example of a SPAD where the dead time represents the time between the generation of one avalanche, and the full recharge of the diode. In order to detect two consecutive pulses, such a detector thus would require the pulses to be spaced in time of at least its dead time. In the case of an uncontrolled multi-user environment a pulse from a secondary system could therefore blind the detector during the time the real echo arrives. In the case for example of an m-sequence implementation, this negatively impacts the autocorrelation which thus increases the likelihood to need to measure longer, and thus slows down a distance acquisition.

A particular group of malicious multi-user environment participants are so-called spoofers or jammers. These systems try to inject wrong distance measurements, so that the TOF system would see a wall where there is none, or to force the TOF system to report inconsistent distances. One such jammer is for example disclosed in Borosak WO2015128682: their system detects the average pulse repetition rate of a targeted lidar system; including the statistical distribution in the case this targeted lidar system applies a form of random delays. Said lidar jammer detects for example an average pulse delay of 1 µs, corresponding to 1 MHz, with random delays in steps of 0.1 µs. Said lidar jammer thus synchronizes with the targeted lidar system and emits at 10 MHz.

This jammer doesn't know the pseudo-random pattern of the targeted lidar system, and thus cannot predict future delays. But by exploiting realistic limitations of hardware implementations of such (pseudo-)random patterns their strategy can jam such TOF systems nonetheless. The multi-user scenario has to address this type of participants as well.

The present invention proposes a solution to the multi-user scenario that manages a TOF device at a local level. Therefore, there is no need for a control or coordination unit. The disclosed method to deal with the multi-user environment provides a possibility and an incentive for different TOF devices to cooperate via an independent channel, but without relying on the benevolence of such participants. The present invention is immune to both intentionally and unintentionally malicious multi-user environment participants.

DISCLOSURE OF THE INVENTION

It is an aim of this invention to provide a method and a device for measuring a distance to a target in a multi-user environment by using at least two wavelengths wherein the measured TOF is immune to both intentionally and unintentionally malicious multi-user environment participants.

According to the present invention, the aforementioned aim is achieved with a method for measuring a distance to a target in a multi-user environment by means of at least one sensor, comprising:
  irradiating the environment by means of a series of light pulses, wherein this series of light pulses are emitted by a battery of at least two single light source devices emitting on at least two different wavelengths and/or by a single light source emitting on at least two different wavelengths, and said light pulses being emitted at a determined repetition rate and with a determined randomly selected wavelength;
  collecting pulses that are reflected or scattered from the environment to at least one detector equipped with a wavelength filter whose pass band corresponds to the selected emitted wavelength;
  assigning a timestamp at the detection of a pulse by means of at least one chronometer connected to the detector, said timestamps corresponding to the time of arrival (TOA);
  determining the statistical distribution of said time of arrivals;
  determining the distance to the target from said statistical distribution.

The method further comprises the step of using at least one sub-unit collecting pulses that are reflected or scattered from the environment to at least one detector equipped with a wavelength filter and presumably containing timestamps corresponding to emitted pulses and at least one control sub-unit collecting pulses that are reflected or scattered from the environment to at least one other detector equipped with a wavelength filter, said control sub-unit not containing timestamps corresponding to the emitted pulses, and said control sub-unit being allowed to stay empty.

Moreover, the step of determining the distance from the statistical distribution of said TOAs consists in determining the TOA that appears most often in the distribution with respect to the randomly distributed noise contribution, said TOA corresponding to the time of flight (TOF).

Advantageously, the pulse repetition rate (PRR) is varied for every distance measurement.

Moreover, each TOF system broadcasts via an independent channel a determined pulse repetition rate (PRR) to the other TOF systems.

Preferably, each TOF system broadcasts via an independent channel at least two different determined pulse repetition rates (PRRs) to the other TOF systems.

Alternatively, each TOF system broadcasts via an independent channel a determined wavelength to the other TOF systems.

Preferably, each TOF system broadcasts via an independent channel at least two different determined pulse repetition rates (PRRs) to the other TOF systems.

Another object of the present invention concerns a device for measuring a distance to a target in a multi-user environment comprising:
  at least an irradiation device of said environment providing at least a series of light pulses, said irradiation device comprising a battery of at least two single light source devices emitting on at least two different wavelengths and/or a single light source emitting on at least two different wavelengths, and said light pulses being emitted at a determined repetition rate and with a determined randomly selected wavelength;
  at least one detector equipped with a wavelength filter whose pass band corresponds to the selected emitted wavelength and arranged to detect the reflected pulses from the environment from at least said emitted pulses and connected to at least one chronometer;
  at least means for assigning a timestamp at the detection of a pulse, said timestamps corresponding to the time of arrival (TOA);
  at least means for determining the statistical distribution of said time of arrivals; and
  at least means for determining the distance to the target from said statistical distribution.

Said means for determining the statistical distribution of said time of arrivals comprise at least one sub-unit presumably containing timestamps corresponding to emitted pulses and at least one control sub-unit not containing timestamps corresponding to the emitted pulses, said control sub-unit being allowed to stay empty.

Moreover, said means for assigning a timestamp at the detection of a pulse comprises at least one sub-unit collecting pulses that are reflected or scattered from the environment to at least one detector equipped with a wavelength filter and presumably containing timestamps corresponding to emitted pulses and at least one control sub-unit collecting pulses that are reflected or scattered from the environment to at least one other detector equipped with a wavelength filter, said control sub-unit not containing timestamps corresponding to the emitted pulses, and said control sub-unit being allowed to stay empty.

Preferably, the means for determining the distance from said statistical distribution of TOAs consists in means for determining the time of arrivals that appears most often in the distribution with respect to the randomly distributed noise contribution, said time of arrivals corresponding to the time of flight.

Advantageously, said device comprises at least means for varying the pulse repetition rate (PRR) for every distance measurement.

Moreover, it further comprises means for broadcasting via an independent channel a determined pulse repetition rate (PRR) to the other TOF systems.

Preferably, it further comprises means for broadcasting via an independent channel at least two different determined pulse repetition rates (PRRs) to the other TOF systems.

BRIEF DESCRIPTION OF THE DRAWINGS

The invention will be further elucidated by means of the following description and the appended drawings.

DESCRIPTION OF PREFERRED EMBODIMENTS

Figure 1:
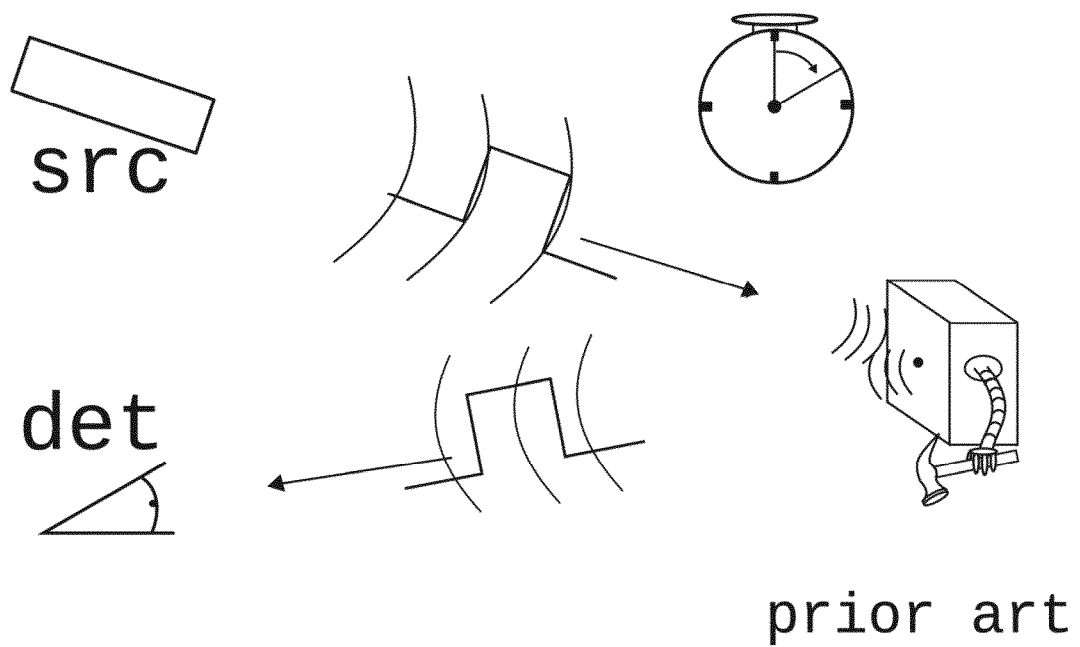
FIG. 1 is a schematic representation of a direct TOF system of prior art.
Figure 2:
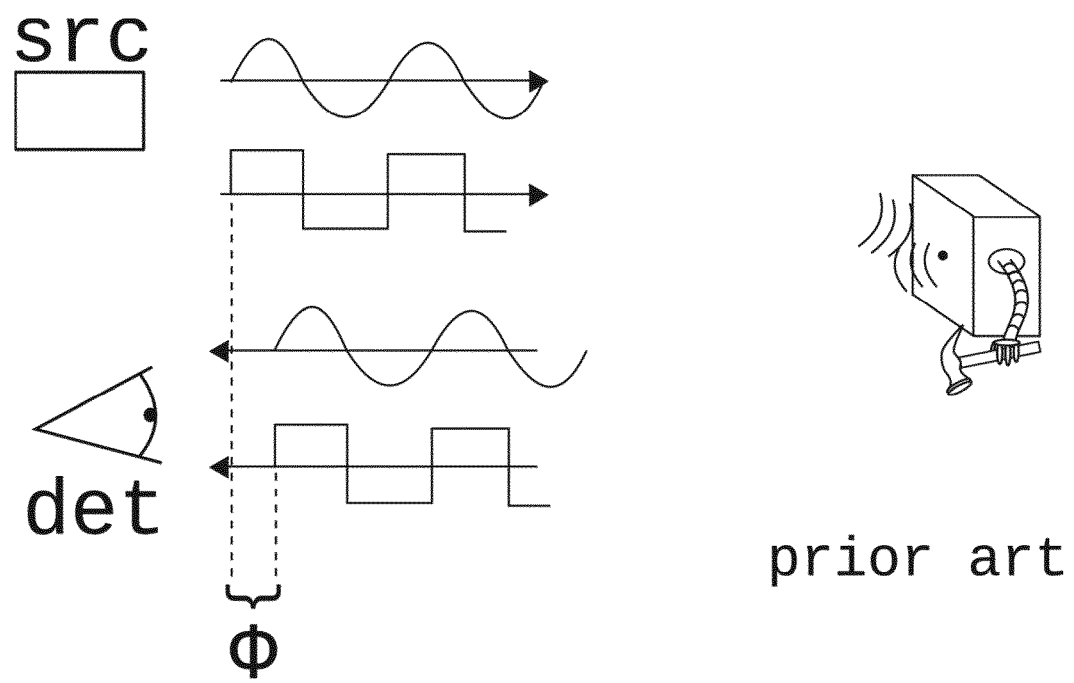
FIG. 2 is a schematic representation of an indirect TOF system of prior art.

The present invention will be described with respect to particular embodiments and with reference to certain drawings. The invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Figure 3:
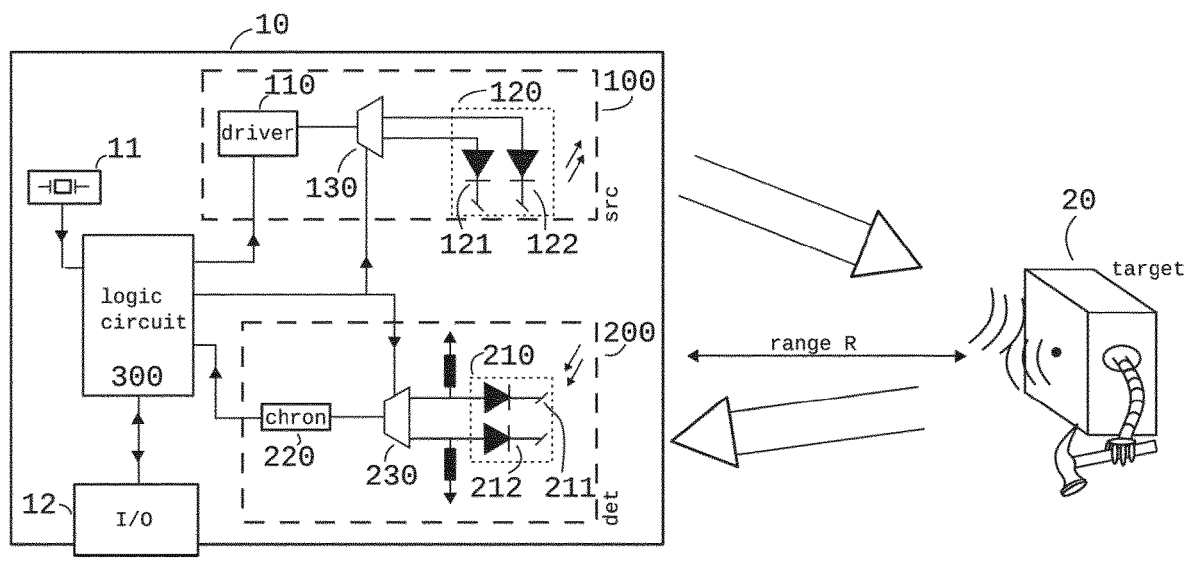
FIG. 3 is a schematic block diagram of the TOF system according to the invention.

Referring to FIG. 3, one embodiment of the present invention is a distance ranging system composed of at least three components: a light emission circuit (100), a detection circuit (200), and a logic circuit (300). FIG. 3 illustrates such a time-of-flight (TOF) system (10) at a distance R from a target (20).

More precisely, the preferred embodiment of the present invention is a version of direct TOF (d-TOF) light detection and ranging (lidar) with an em-radiation of frequencies $\geq 1$ THz. The TOF system has an interface (12) allowing it to communicate with a host machine which utilizes the system to range its environment. The logic circuit (300)—of which several embodiments are given in FIGS. 4, 5 and 9-14, respectively—has the task to control, evaluate, and communicate the measurement in the fashions described hereinafter. The measurement control unit (MCU) (320)—which can be a microprocessor, FPGA, a finite state machine, or similar—coordinates the measurements according to what the host machine requests via interface (12). This MCU allows to abstract from the request of the host machine—to acquire a distance measurement, or intensity, or the like, as described hereinafter—and the steps to be applied according to the present invention.

The present invention employs pulsed light sources on emission side. These light sources are typically composed of a battery (120) of different (at least two) single light source devices (121, 122); emitting on at least two different wavelengths. Alternatively said light source battery (120) could be a single laser device whose wavelength can be tuned for example by means of a piezo electric crystal within the laser cavity which allows selecting different emission wavelength using one single device. Said light source battery (120) is controlled by means of at least one driver (110). Said driver (110) receives its instructions on how to drive the light source battery (120)—i.e. when to pulse, what pulse duration, what pulse amplitude, etc.—from logic circuit (300). The light source devices (121, 122) are typically lasers such as VCSELs, VCSEL arrays, edge emitters, or fiber lasers. Other light sources, such as LEDs, could be used as well.

By means of switch (130) different light source devices (121, 122, etc.) of the light source battery (120), and thus different wavelengths can be selected. Switch (130) can be set between driver (110) and light source battery (120), as indicated in FIG. 3. Other configurations can be thought of as well. For example, driver (110) itself could be equipped with different independently steerable channels, each of which is connected with a light source device (121, 122). Yet another embodiment could have a driver dedicated per light source device (121, 122). In such a configuration switch (130) could be placed before said drivers.

Alternatively, such a switch could be for example a shutter mounted on top of a continuously emitting light source, which thus controls for how long the emission is blocked or released, respectively.

The system according to the invention comprises at least one detection battery (210) composed of different (at least two) detectors (211, 212), equipped with at least one wavelength filter. Preferably said wavelength filters correspond to the different wavelength spectra of the light source battery (120). The choice of wavelength filters depends on system level aspects and can be a combination of short pass, long pass, band pass, and/or notch filters. As an example one could combine a red, a green and a blue light source in the light source battery (120) with a filter and detection array in the detection battery (210) using RGB-filters known for example from CCD and CMOS cameras. The detectors (211, 212) can be for example composed of a single-photon avalanche diode (SPAD) array (such as described by Niclass et al. U.S. Pat. No. 8,168,934), other possible detectors are for example avalanche photo diodes (APDs), or silicon photo multipliers (SiPM).

Said detection battery could consist of only one detector whose wavelength filter can be tuned, and thus effectively act as different detectors over time. Examples for such filters are piezoelectric or ferroelectic actuated Fabry-Perot interferometers. Other interferometers, such as Mach-Zehnder, could be thought of as well. Instead of a piezo actuator other means, such as stepper motors could also be used, depending on system level considerations. Beside interferometers also Bragg gratings could be used whose grating period can be manipulated by applying for example force or temperature. These could again be driven by means of piezo actuators or motors, and/or coils or heat exchangers. Such tunable filters are discussed in for example D. Sadot et al., "Tunable Optical Filters for Dense WDM Networks," IEEE Communications Magazine, 1998, doi: 10.1109/35.735877.

Said detection battery (210) is connected with at least one chronometer (220) providing a reliable time base, and in particular providing a timestamp for a pulse detection.

Figure 4:
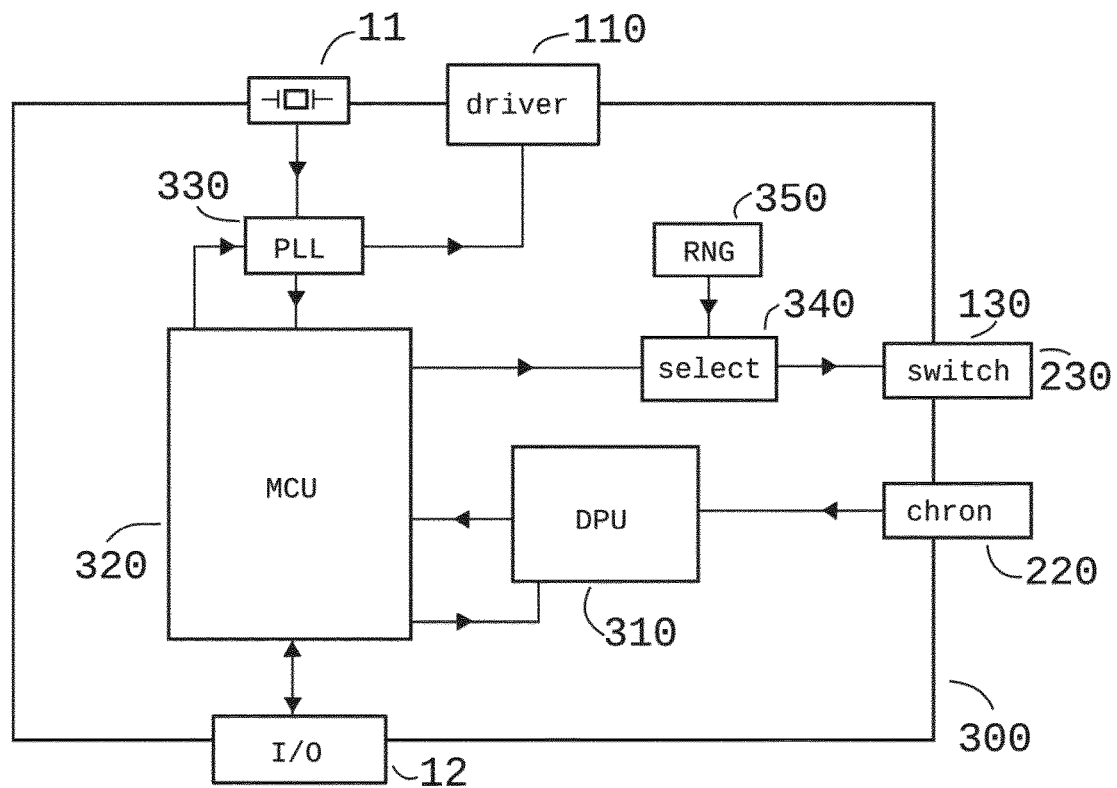
FIG. 4 is a schematic block diagram of the logic circuit of the TOF system according to the invention illustrated in FIG. 3.
Figure 5:
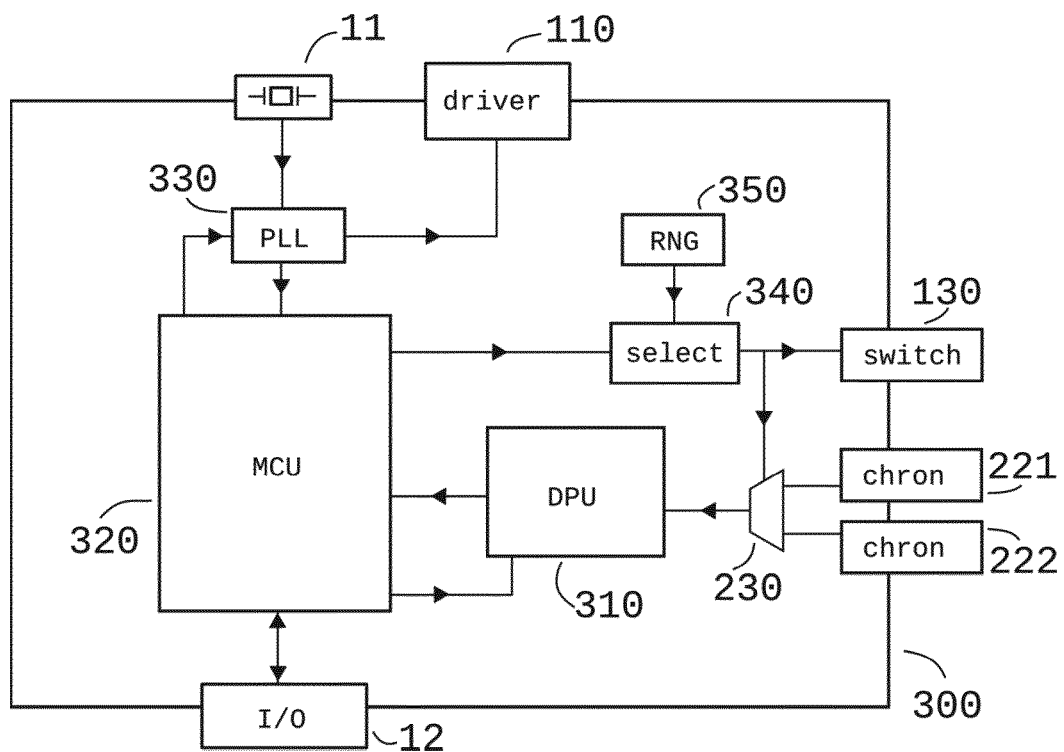
FIG. 5 is a schematic block diagram of another embodiment of the logic circuit of the TOF system according to the invention illustrated in FIG. 3

Referring to FIGS. 3 and 4, a switch (230) between detection battery (210) and chronometer (220) allows connecting only the one detector whose wavelength filter corresponds to the wavelength of the activated light source device in the light source battery (120). Alternatively, every detector (211, 212) can be connected to its own chronometer (221, 222). In such a configuration switch (230) can be placed after the chronometers (221, 222), as indicated in FIG. 5.

This chronometer is typically a time-to-digital converter (TDC) as for example disclosed by Kumar et al. WO2013/034770, but also a time-to-analog converter (TAO) (e.g. Steinich et al. U.S. Pat. No. 6,479,986), or a synchronous counter (Nakajima et al. US2002/015467) counting elapsed cycles of a high speed (typically in the order of GHz) clock, or a simple delay line could be used.

In the preferred version of TOF ranging a distance measurement consists of several single acquisitions of the time-of-arrival (TOA) of detected pulse events coming from the detector. These single TOA acquisitions are entered into a data processing unit (DPU) (310). The DPU (310) has the task to statistically process the discrete distribution of timestamps coming from the chronometer (220) during the integration time, and to output values representing measurement quantities such as for example distance, or intensity, or the width of the detected pulse, or the number of detected pulses, or a combination of such quantities, along with potentially confidence levels for each of the reported quantity, depending on what the MCU requests.

Figure 6:
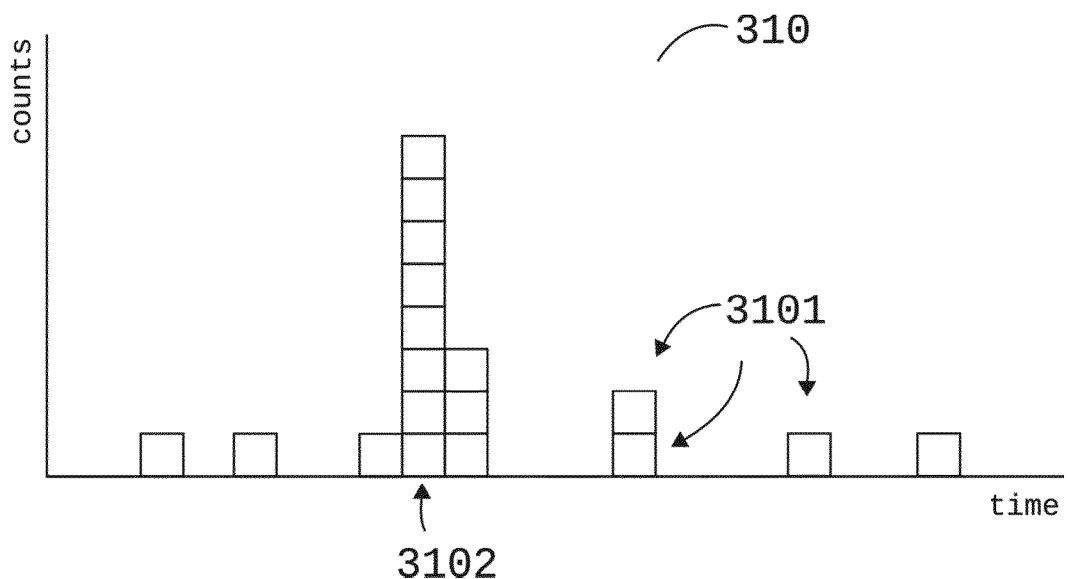
FIG. 6 is a histogram highlighting various time of arrival (TOA) entries and the corresponding time of flight (TOF) position.

This task can be achieved in a variety of ways. One possibility is based on histograms as implemented e.g. in Tenhunen et al. US2015/0377677 and Gariepy et al. WO2016/063028, and is illustrated in FIG. 6. It should be noted, however, that a histogram is only but one option to achieve this task without departing from the scope of the invention. Data stream algorithms, such as described in for example Cormode et al. "Finding frequent items in data streams," VLDB, 2008, could be used as well. The given pseudocode examples facilitate their implementation considerably. In the rest of the description a histogram implementation is assumed, as this option allows introducing relevant concepts step by step.

In general there are three possible sources of TOA events: pulses originating from the TOF system's own emitter; other pulses present in the environment (such as lamps or sun); and thermally induced events within the detector itself without the incidence of a pulse. The first source is considered as the signal contributions. They are synchronized and therefore time correlated with the detector. The latter sources are considered as noise contributions. They are randomly distributed in time. The signal contributions can be discriminated from the noise contributions through statistical processing.

In a histogram implementation of the DPU the number of occurrences of each TOA value (3101) is recorded. After a certain integration time, because of the statistical processing, the signal contributions stand out from the noise contributions, as illustrated in FIG. 5.6 by peak (3102). Given such a statistically processed histogram various methods can be applied to extract the corresponding TOF value. For example the DPU could report the identifier of the histogram bin containing the maximum counts. A more sophisticated algorithm such as discussed in Blais et al. "Real-time numerical peak detector," Signal Processing 11, 145-155, 1986 could be implemented as well.

Alternatively, the DPU could report for example on the delimiter from which to which bin the peak exceeds the noise floor.

Methods have been developed, based on the idea to exploit the statistical difference between signal and noise, in order to decrease the number of noise counts in the histogram: either by recording only events that are detected in coincidence with at least one other event (C. Niclass, "A 100 m-Range 10-Frame/s 340×96-Pixel Time-of-Flight Depth Sensor in 0.18 m CMOS," IEEE, (2011)), or that the number of detected photons has to exceed a certain threshold before being considered, thus allowing for a variable dynamic range of detection, see Niclass et al. WO2010149593.

In a multi-user scenario environment, an additional noise source has to be considered: the signal of a foreign TOF system.

Figure 7:
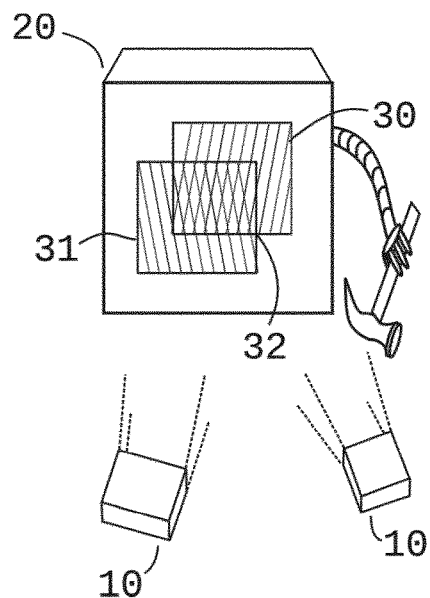
FIG. 7 is a schematic representation of the multi-user problem.
Figure 7:
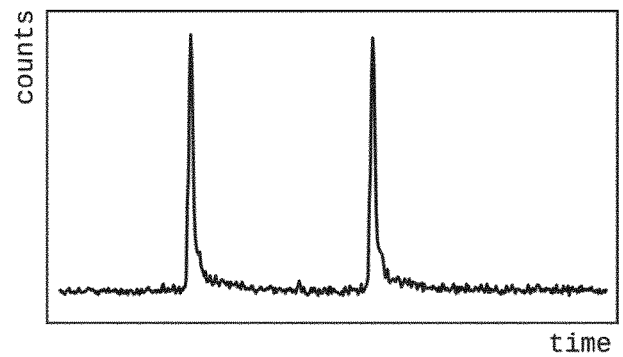

Referring to FIG. 7, two equivalent TOF systems (10) according to FIG. 3 are illustrated to irradiate the target (20) with each their corresponding field of views FOVs (30, 31), which is shown to partially overlap (32). Plotted alongside is a histogram seen by one of the two TOF systems displaying multiple peaks. One of the peaks shown corresponds to the correct distance between TOF system and target. The other peak occurs with a certain time delay given by the relative distances between the different radiation sources, and the phase difference between the emission of the own transmission and the foreign radiation source. In a scenario of three or more such TOF systems correspondingly more peaks would appear. For the occurrence of these foreign peaks a partial overlap (32) of the FOVs is sufficient, but not necessary.

Figure 8:
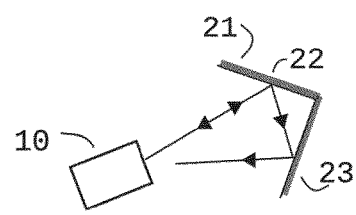
FIG. 8 is a schematic representation of the occurrence of multi-peaks without the presence of a second system according to the invention.
Figure 8:
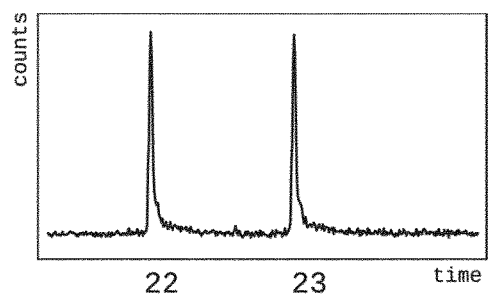
Figure 8:
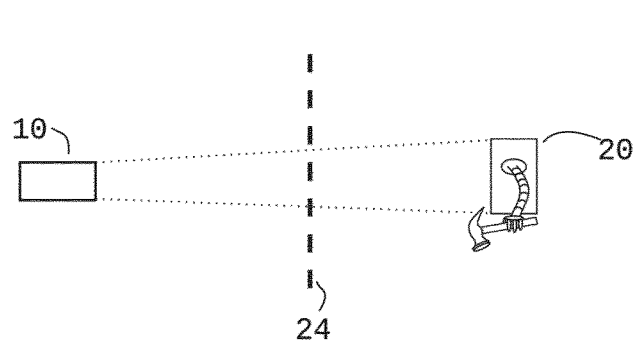
Figure 8:
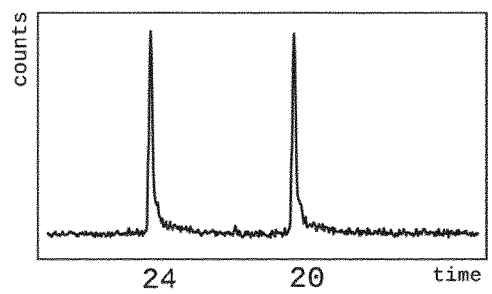

Referring to FIG. 8, it is important to stress that there are situations in which a TOF system can see multiple peaks (i.e. multiple distances) without the presence of secondary TOF systems. One such case relates to multi-path detections when irradiating for example a corner (21) which results in a distance corresponding to a first surface (22) and a second surface (23). Another scenario that leads to a multi-peak detection is given in the case a semi-transparent object (such as a net or a fence) (24) resides between TOF system (10) and target (20). These examples show that detecting the occurrence of a secondary peak is not sufficient to unambiguously determine the presence of a secondary TOF system.

Noise contributions due to secondary TOF systems cannot be circumvented with coincidence or threshold detection, as there indeed is a higher concentration of pulses corresponding to the detection of these fake distances.

For the sake of simplicity, in the following detailed description we restrict ourselves to mention two TOF systems in the multi-user environment; system A, that implements the disclosed invention, and system B, with an arbitrary, possibly unknown third-party implementation. Again for the sake of simplicity, we assume this system B to show the same characteristics as the present invention. These restrictions facilitate communication, but as shall be seen the present invention is applicable for an arbitrary and unknown number N of participating systems.

At first we assume system B to emit at a fixed pulse repetition rate, say $f_{PRR}^{(B)}=1$ MHz and at a certain wavelength. If system A emits and reads out at the same repetition rate, the pulses of B would build up a peak in the histogram of system A. This is again exactly the description of the multi-user scenario without mitigations, as displayed in FIG. 7. In order to circumvent this interference, in one embodiment of the present invention the MCU (320) varies the pulse repetition rate (PRR) for every distance measurement. For example, the system clock (11) could run at 100 MHz with which the MCU has access, for example by a division factor of 100, to 1 MHz. By changing the division ratio from 99, to 100, to 101, and back, at least some of these measurements are acquired in the condition of $f_{PRR}^{(A)'} \neq f_{PRR}^{(B)}$. In this case the pulses of B are not synchronized with A, the detections are scattered throughout the histogram of A, and no wrong peak could form.

Except, for this embodiment to work properly in a totally uncontrolled environment it would have to recognize the fact that a second system is present. Otherwise it doesn't know the significance of the second peak appearing in some of the distance measurements as mentioned above. Secondly, with this embodiment, system A, would still have to measure a multitude of pulses in order to discriminate its own pulses from those of B, i.e. compare the occurrences of peaks in different distance measurements and discard the one peak that doesn't appear in all of them. Such an endeavor becomes more and more cumbersome the higher the number of participating systems in the multi-user environment. During this time system B could change its pulse repetition rate $f_{PRR}^{(B)'}$ and again end up with the same pulse repetition $f_{PRR}^{(A)'} \neq f_{PRR}^{(B)'}$, especially if system B happens to apply the same algorithm to change the division ratio as system A. Additionally, the multi-user scenario needs to account for malicious participants. A simple frequency or pulse repetition rate hopping implementation cannot avoid a system that intentionally changes to a matching pulse repetition rate. For these reasons, in another embodiment of the present invention system A thus emits at a certain pulse repetition rate $f_{PRR}^{(A)}$ and randomly selects (340) for every pulse one of the light source devices in the light source battery (120) via switch (130), said selection is given by random number generator (RNG) (350).

Figure 9:
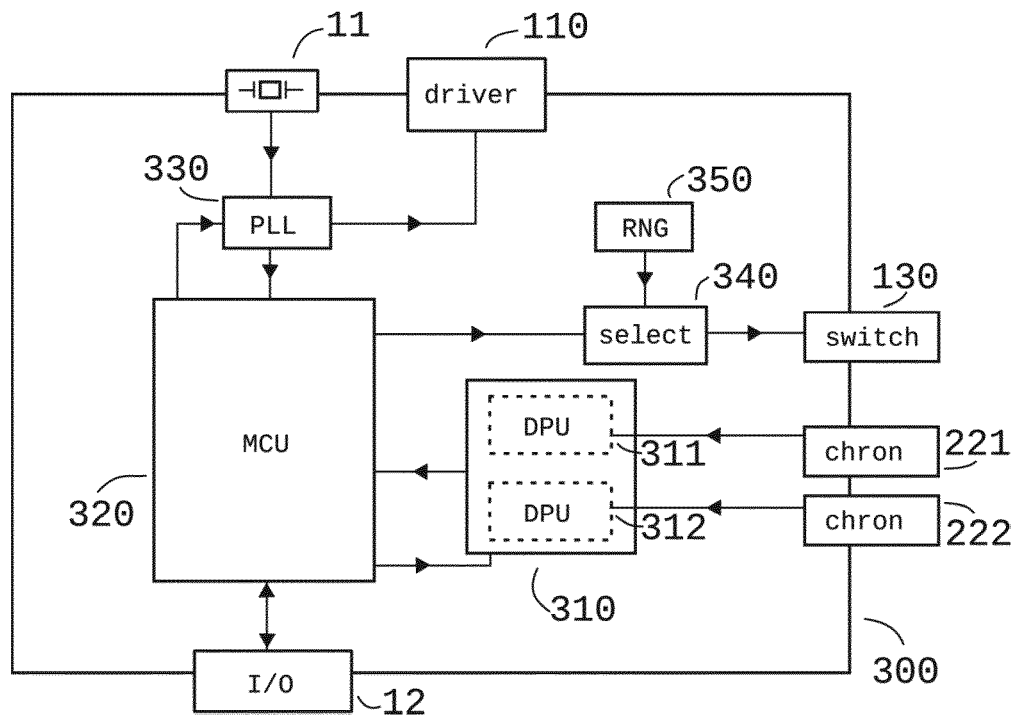
FIG. 9 is a schematic block diagram of a second embodiment of the logic circuit of the TOF system according to the invention illustrated in FIG. 3.

On detection side the wavelength selection (340) is transmitted to switch (230) thus connecting the corresponding detector (as illustrated in FIG. 4), or the corresponding chronometer with the DPU (as illustrated in FIG. 5), respectively, depending on the implementation. Yet another embodiment could use one DPU per detector and chronometer as indicated in FIG. 9. In such a case the wavelength selection (340) would lead to a switch before the MCU stage.

Instead of connecting different detectors (or chronometers, or DPU outputs, respectively) with the chronometer (or DPU, or MCU, respectively) in another embodiment the different detectors are turned on or off depending on the selection (340) and switch (230), respectively. Such a system may be beneficial as it typically consumes less power: a powered detector keeps detecting—thus consuming power—despite the fact that its detection isn't relayed further anyway.

Switch (230) is switched whenever a new wavelength is selected (340). The request to select a new wavelength comes from the MCU (320). The moment when this new selection is requested, respectively applied, depends on system level aspects. Switching too early or too late can reduce the performance of the TOF system. For example, the selection (340) could be applied at switch (130) consistently immediately after the pulse is emitted. In such a case switch (230) would activate consistently the wrong detector corresponding to the wrong wavelength. Such problems could be avoided by means of for example an analog and/or digital delay between selection (340) and switch (230), which is obvious for a person skilled in the art deciding on said system level aspects.

Referring again to FIG. 9, in another embodiment of the present invention each detector (211, 212) is connected to its own chronometer (221, 222), which are connected to the DPU (310) using multiple input channels. In such a configuration the DPU (310) is split into at least two stages: in a first stage at least one sub-unit (311, 312) per chronometer processes the timestamps from the chronometer as described in the embodiments mentioned so far. The sub-units (311, 312) can operate in parallel to each other. A second stage compares the results of those sub-units and only reports the properties of those peaks that are for example present in all of the sub-units.

Figure 10:
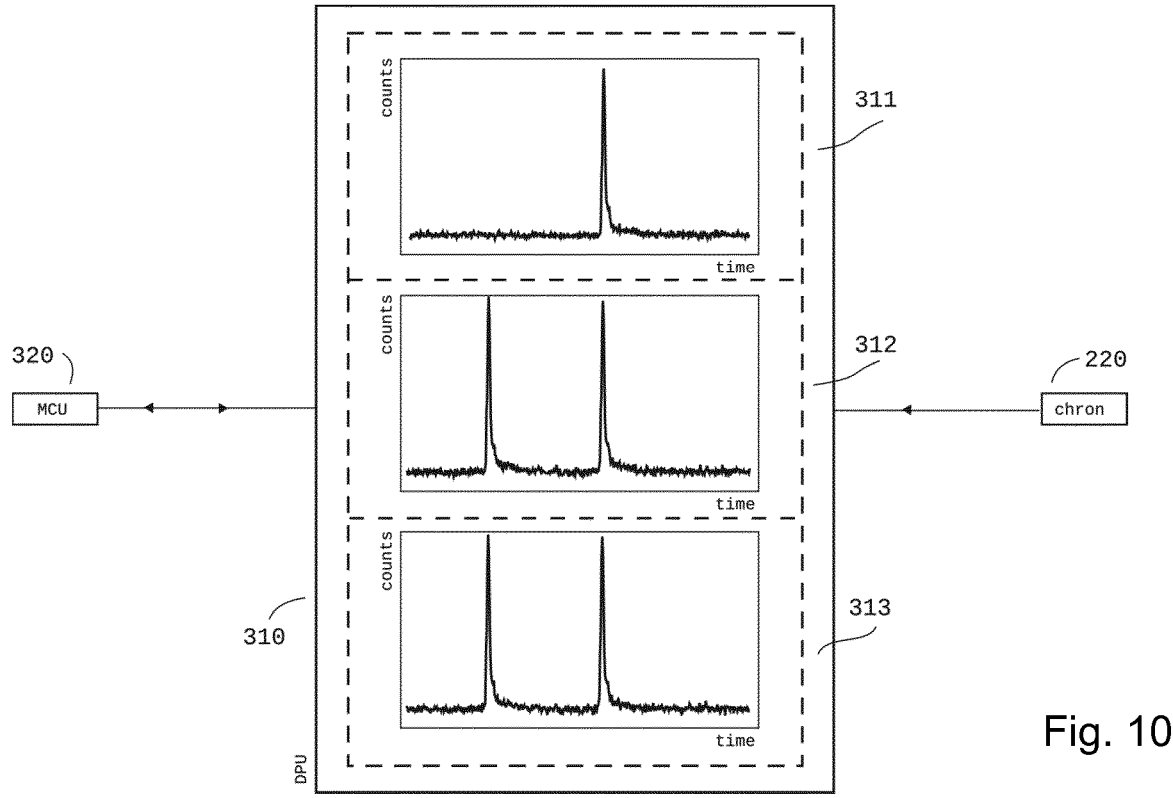
FIG. 10 is a representation of a data processing unit (DPU) implementation based on the logic circuit of the TOF system according to the invention illustrated in FIG. 9

In FIG. 10 three such sub-units (311, 312, 313) are illustrated. In one embodiment system A emits at randomly alternating $n_\lambda=3$ different wavelengths. The detector battery (210) is composed of detectors for the corresponding wavelengths. Those detectors are connected with sub-unit (311), (312), and (313), respectively. In the assumption that system B emits only at the wavelengths corresponding to (312) and (313), the DPU of system A sees two peaks built up in (312) and (313). Of these two peaks it is not clear whether the left or the right peak corresponds to a ghost or real distance, respectively. Since the left peak is absent in (311) (in this example), the correct peak can be deduced as being the right one (in this example).

It can be dangerous to rely on the assumption that the other participants in the multi-user environment emit on at least one wavelength less than the available $n_\lambda$. Especially, if one has to expect a malicious participant that purposely emits at the same PRR and at all $n_\lambda$ wavelengths. For this reason, in another embodiment of the present invention the selection (340) skips at least one of the available $n_\lambda$ wavelengths during an integration time. In this embodiment the sub-unit corresponding to the skipped wavelength (e.g. (311)) acts as a control sub-unit. In the example illustrated in FIG. 10 the DPU can deduce that the right peak in (312) and (313) corresponds to a ghost distance as the corresponding wavelength of (311) was not emitted by system A. If a participant of the multi-user environment happens to emit its wavelengths at the same PRR but in different phases, the various sub-units would find peaks corresponding to distances that potentially couldn't be invalidated by the control sub-unit.

In another embodiment the DPU (310) consists of only two sub-units, the active sub-unit and the control sub-unit. For each selection (340) of the emitted wavelength the corresponding detector is connected (through chronometer (220)), by means of switch (230), with the active sub-unit. During that time all other detectors are connected with the control sub-unit. Analogously to the previously stated embodiment the ghost distances can be distinguished from the real distances by comparing the active sub-unit with the control sub-unit. This embodiment can also deal with participants emitting its wavelengths at different phases, as the control sub-unit doesn't rely on a particular wavelength.

Yet another embodiment can work with multiple active sub-units and/or control sub-units. This allows monitoring for example one particular wavelength with a sub-unit dedicated to this wavelength. In this embodiment it is hence possible for example to observe whether there is a participant in the multi-user environment that emits at the corresponding PRR and said monitored wavelength of system A. Such information could for example be used for the selection of the wavelengths of the subsequent integration time.

Figure 11:
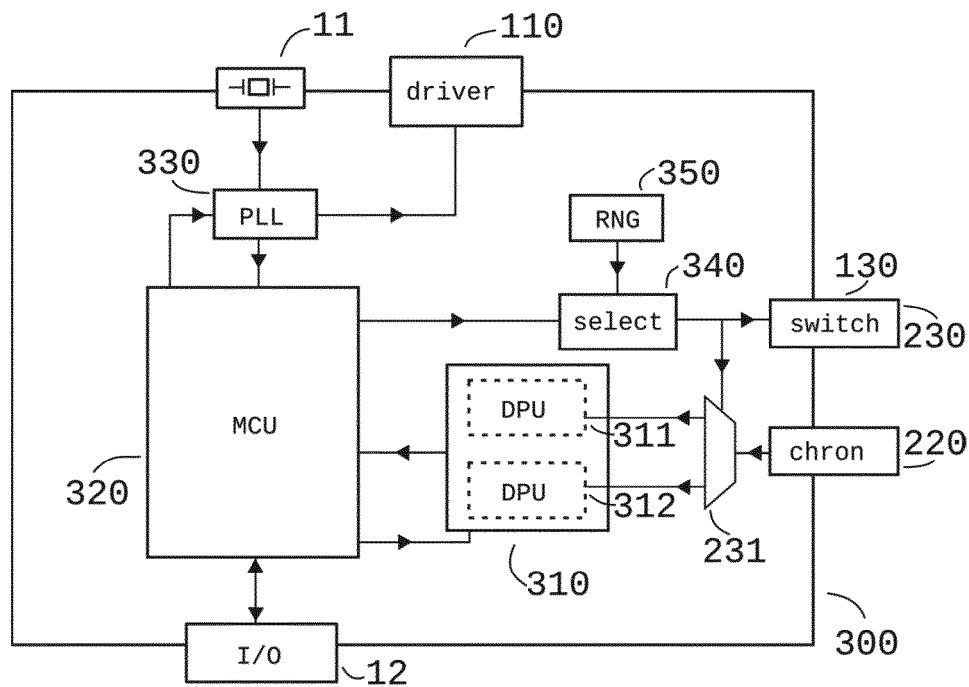
FIG. 11 is a schematic block diagram of a third embodiment of the logic circuit of the TOF system according to the invention illustrated in FIG. 3.
Figure 12:
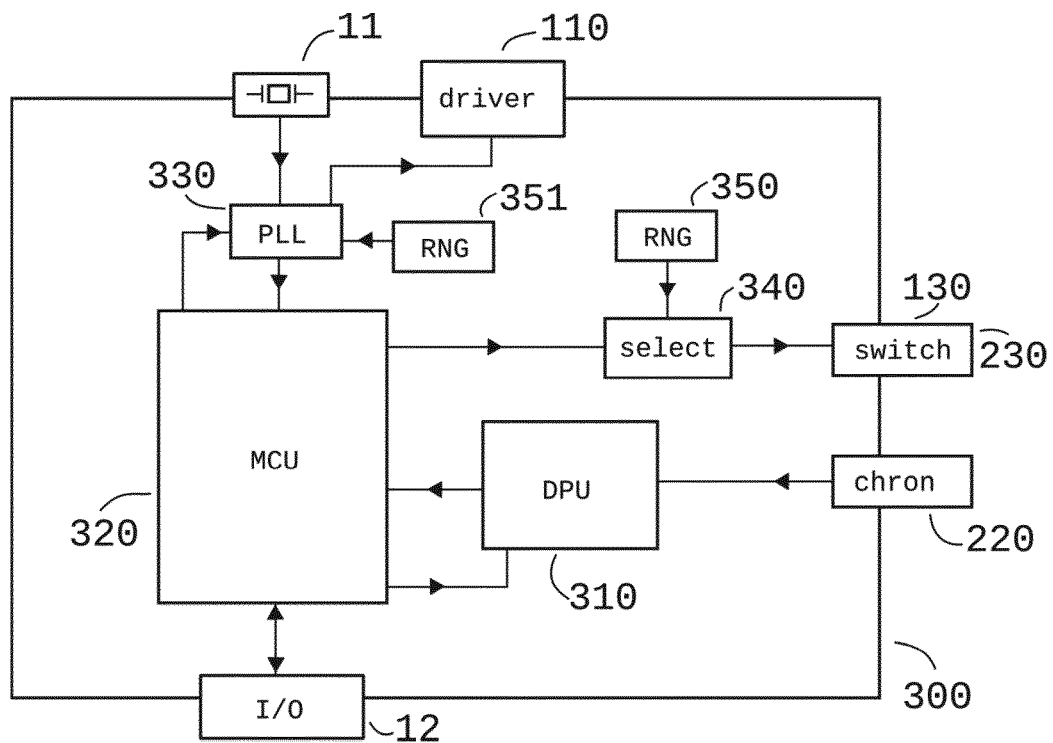
FIG. 12 is a schematic block diagram of a forth embodiment of the logic circuit of the TOF system according to the invention illustrated in FIG. 3.

Referring to FIG. 11, in another embodiment the detectors (211, 212) are switched (230) onto a number of chronometers lower than the number of detectors, as indicated in FIG. 3, and again switched onto different DPU (310) inputs corresponding to various sub-units (311, 312), as explained with respect to the previous embodiments. This way of sharing internal resources is typically attractive to save costs.

It should be noted that the described mode of operation is significantly different from for example m-sequence demodulation, introduced in the background of the present invention, where the properties of the emitted pattern can lead to missing the correct echo altogether, if for example the underlying phase shift is too large.

The system according to the invention has no need to store the sequence of applied random wavelength selection for the use in a matching filter. Nor does the system according to the invention rely on detecting a whole (sub)sequence of randomly emitted pulses; as is for example the case in m-sequence pseudorandom (de)modulation. As pointed out by Rieger et al. "Range ambiguity resolution technique applying pulse-position modulation in time-of-flight scanning lidar applications," Opt. Eng. 53(6), 2014, doi: 10.1117/1.OE.53.6.061614, a matched filter is based on the convolution of a signal sequence with its impulse response. This requires to modulate (/demodulate) the emission (/detection) with a known, determined signal sequence. The system according to the invention does not rely on such known or determined sequences.

The proposed method according to the present invention is insensitive to the loss of transmitted pulses. Secondly, on the level of an individual detection, false positive and false negative detections are not detrimental to the overall distance measurement.

Applying a different wavelength at (up to) every emitted pulse reduces the risk to converge to a fake distance measurement significantly as explained in the embodiments mentioned above. This is true even if the multi-user environment participants emit at the same pulse repetition rate (PRR). Nonetheless, in the case said participants emitted at different PRRs, the spread of the detected secondary peaks would further increase. This is beneficial for the SNR in the histogram of each participant. Based on this reasoning another embodiment of the present invention applies a (pseudo-)randomly chosen different PRR for every distance measurement.

For every distance measurement the MCU (320) requests an average PRR from the programmable clock (PLL) (330). This request can be interpreted as ordering a certain division factor (say 100) to obtain for example 1 MHz. The actual division factor obtained is modified by the RNG (351) as sketched in FIG. 12. The average repetition rate is generated with for example a division factor of 99 or 101, or indeed 100 as requested.

There are several reasons the MCU wants to measure a distance whereas the PRR suffices to be only approximately the requested value. For example, a certain PRR defines the round trip ambiguity of said distance measurement. A 1 MHz PRR corresponds to about 150 m round-trip (assuming the propagation speed being the speed of light). If the overall TOF system is design limited to say 100 m then also a 1.5 MHz PRR allows a pulse spacing of this limiting ambiguity range. The acceptable variation to the division factor hence goes from 100 (for 1 MHz) to 67 (for 1.5 MHz), so that a 5-bit RNG code could modify the requested approximate PRR. Other reasoning on system level can bring up other desired limitations or flexibilities; this example merely illustrates one possibility.

Figure 13:
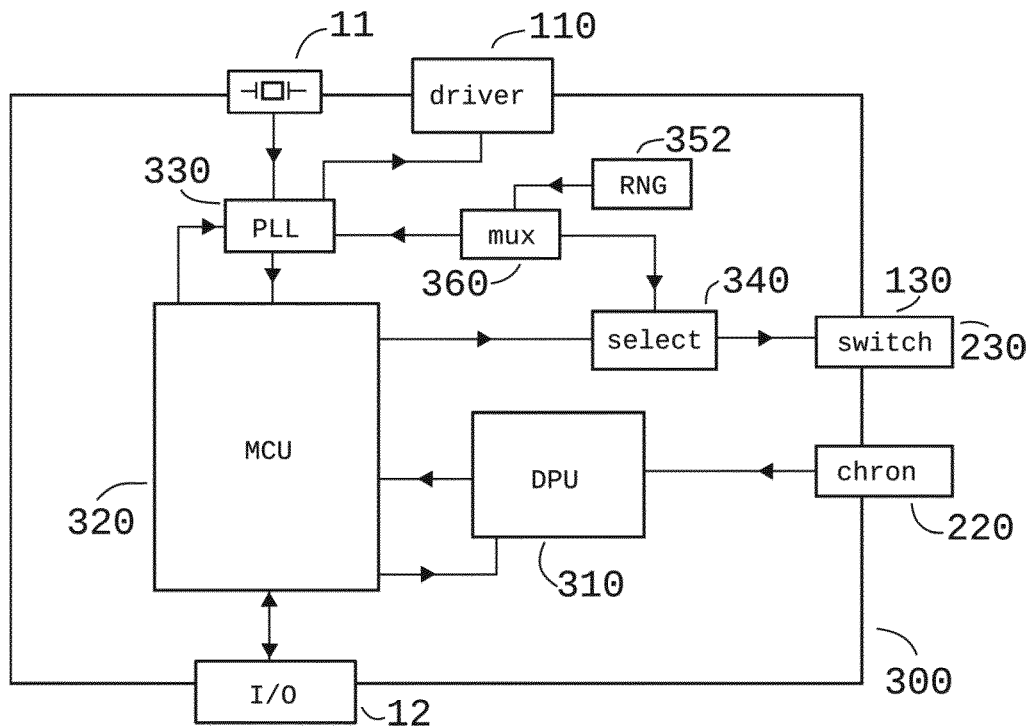
FIG. 13 is a schematic block diagram of a fifth embodiment of the logic circuit of the TOF system according to the invention illustrated in FIG. 3.
Figure 14:
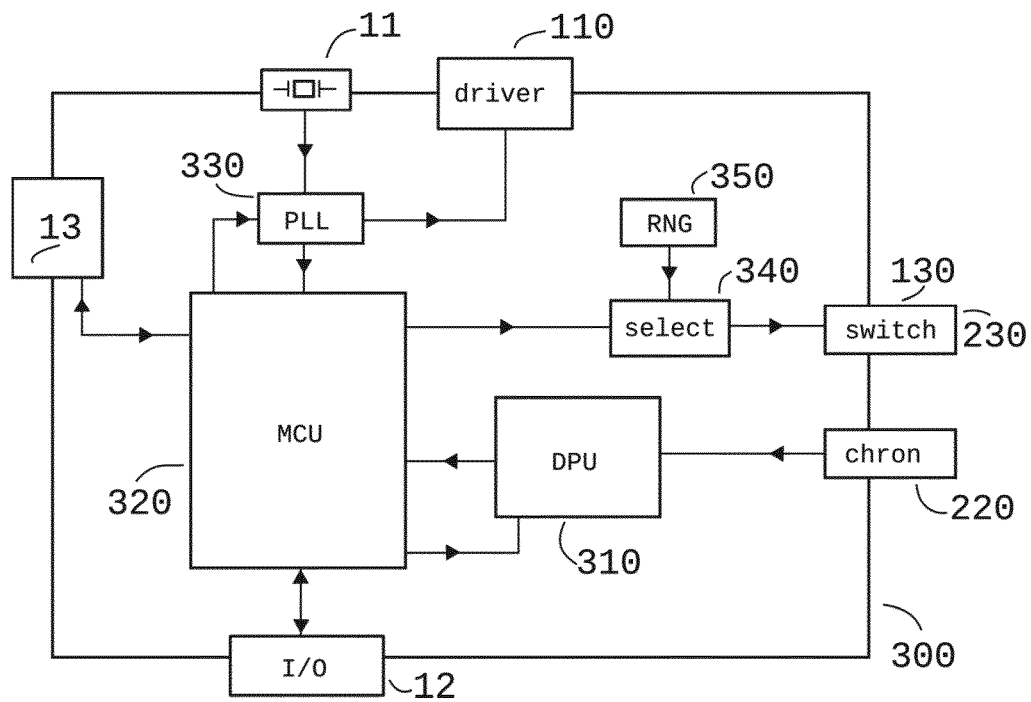
FIG. 14 is a schematic block diagram of another embodiment of the logic circuit of the TOF system according to the invention illustrated in FIG. 3.

Referring to FIG. 13, yet another embodiment can make use of the same RNG (352) for both adopting the PLL and selecting the wavelength, but switched via multiplexer (360) controlled by the MCU (320).

Additionally, the stated SNR benefits create an incentive for participating TOF systems to cooperate. For example the TOF systems could broadcast via an independent channel (13) illustrated in FIG. 14—such as bluetooth, wifi, etc.—what average PRR they chose, which the other systems would try to avoid, in order to improve their own SNR. Alternatively, also a wavelength information could be communicated.

A malicious participant could try to exploit the declared information and to emit at this PRR. For this reason a preferred implementation of such a communication would broadcast at least two different PRRs, so that the malicious participant would have to choose one of the declared PRRs and/or wavelength by chance. In order not to indicate the start of a new measurement said broadcast could be made with a certain (random) shift ahead in time, before applying the PRR. This removes the problem given when the TOF system cannot know which among the participating systems are trust-worthy. Typically, the systems don't communicate out of fear a defecting participant could corrupt the measurement. This leaves all participants in a non-ideal state, whereas cooperation would in fact improve the measurement.

Malicious systems such as proposed e.g. in Borosak WO2015/128682 need to analyze the statistical distribution of the emission parameters. Concerning the present invention said parameters are the pulse repetition rate and the wavelength spectra. The present invention avoids the interference of such intentional jammers by rendering it impractical to determine said required parameters in real time. Since the average PRR changes randomly, this change is likely to happen during the frequency analysis. The jamming device thus needs a significantly longer integration time to determine the right PRR; an asymptotically approaching algorithm wouldn't yield a good enough synchronism.

In the above description it was assumed that the PRR applied is the same for all single acquisitions during one integration time. The primary task of the MCU is to set a PRR, wait for the duration of the integration time, read out the DPU, and transmit the read out distance values while requesting another PRR, and repeat.

In yet another embodiment the request for a new PRR happens asynchronously from waiting during the integration time, before reading out the DPU. As a result also the PRR can change during the integration time, either in predefined intervals, or again using an RNG element.

The random selection of activated wavelengths allows not using at least one of the installed wavelengths during at least part of an integration time, as described above. A malicious participant has difficulties evaluating which wavelengths to emit at. Such a malicious participant has the option to emit at all wavelengths—in the spirit of Borosak WO2015/128682—but in this case the control sub-unit can again filter the fake peaks, as explained.

The RNGs can either be, for example, a source of physical real random noise, or using linear-feedback shift registers. The choice of RNG (350, 251, 352)—whether for example to use real physical random noise, or a pseudo random scheme employing linear-feedback shift registers, or another implementation—depends on system level aspects evident for a person skilled in the art.

Moreover, the switches (130, 230, 231) can be multiplexers, finite state machines, or similar. Selection (340) can be a multiplexer, a finite state machine, a CPU, an FPGA, or similar.

It will be understood by those skilled in the art that the present invention is not limited to the embodiments illustrated above and that many modifications and additions may be made without departing from the scope of the invention as defined in the appending claims.

The invention claimed is:

1. A method for measuring a distance to a target in a multi-user environment comprising multiple time of flight (TOF) systems, by means of at least one sensor, comprising:
   providing a time-of-flight (TOF) system and a step of irradiating the environment by means of a series of light pulses, wherein this series of light pulses is emitted by a battery of at least two single light source devices emitting on at least two different wavelengths and/or by a single light source emitting on at least two different wavelengths, and said light pulses being emitted at a determined repetition rate and with a pseudo-randomly selected wavelength;
   collecting pulses that are provided from the environment, and/or from reflected or scattered portions of said emitted pulses by the target, the collected pulses being transmitted to at least one detector equipped with a wavelength filter whose pass band corresponds to the pseudo-randomly selected emitted wavelength;
   assigning a timestamp at the detection of a pulse by means of at least one chronometer connected to the detector, said timestamps corresponding to the time of arrival (TOA);
   determining the statistical distribution of said time of arrivals by means of a data processing unit (DPU);
   determining the distance to the target from said statistical distribution.

2. The method according to claim 1 further comprising providing a time-of-flight (TOF) system in which at least two detectors are connected to their own chronometer that are each connected to a DPU that is configured into at least a first stage comprising at least one sub-unit per chronometer and a second stage,
   the first stage being configured to process said time of flights (TOA) per chronometer, the second stage being configured to compare the statistical results provided by said sub-units and being further configured to provide properties of the detected peaks by said sub-units.

3. The method according to claim 1 wherein the step of determining the distance from the statistical distribution of said TOAs consists in determining the TOA that appears most often in the distribution with respect to the randomly distributed noise contribution, said TOA corresponding to the time of flight (TOF).

4. The method according to claim 1 wherein the pulse repetition rate (PRR) is varied for every distance measurement.

5. The method according to claim 1 wherein each TOF system of said multiple TOF systems broadcasts via an independent channel, being independent of the channel used by the irradiating step, randomly selected pulse repetition rates (PRR) to the other TOF systems of said multiple TOF systems.

6. The method according to claim 1 wherein each TOF system of said multiple TOF systems broadcasts via an independent channel, being independent of the channel used in said irradiating step, at least two determined pulse repetition rates (PRRs) to the other TOF systems of said multiple TOF systems.

7. The method according to claim 1 wherein each TOF system of said multiple TOF systems broadcasts via an independent channel, being independent of the channel used in said irradiating step, a pseudo-randomly selected wavelength to the other TOF systems of said multiple TOF systems.

8. The method according to claim 1 wherein each TOF system of said multiple TOF systems broadcasts via an independent channel, being independent of the channel used by said irradiating step, at least two different wavelengths to the other TOF systems of said multiple TOF systems.

9. The method according to claim 1 comprising the steps of:
   providing a time-of flight (TOF) system comprising a DPU configured as two parts being active sub-unit and a control sub-unit, the system comprising a detector array wherein each detector is connected to a switch;
   connecting, by said switch, to said active sub-unit, for each selection of the pseudo-randomly emitted wavelength, a corresponding detector and keeping the other detectors of said detector array connected with said control sub-unit;
   comparing the output, by said DPU, from said active sub-unit with the output of said control sub-unit;

providing, by said DPU, the properties of detected peaks that are present in said active sub-unit and not in the control unit.

10. A time of flight device for measuring a distance to a target in a multi-user environment comprising multiple time of flight (TOF) systems, comprising:
- at least an irradiation device of said environment providing at least a series of light pulses, said irradiation device comprising a battery of at least two single light source devices emitting on at least two different wavelengths and/or a single light source emitting on at least two different wavelengths, and said light pulses being emitted at a determined repetition rate and with a pseudo-randomly selected wavelength;
- at least one detector equipped with a wavelength filter whose pass band corresponds to the pseudo-randomly selected emitted wavelength and arranged to detect light pulses provided by the environment and/or reflected or scattered portions of said emitted pulses by the target, the detector being connected to at least one chronometer;
- means for assigning a timestamp at the detection of a pulse, said timestamps corresponding to the time of arrival (TOA);
- a data processing unit (DPU) for determining the statistical distribution of said time of arrivals; and
- means for determining the distance to the target from said statistical distribution.

11. The device according to claim 10 wherein means for determining the statistical distribution of said time of arrivals comprise at least two detectors connected to their own chronometer that are each connected to a DPU configured as a first stage comprising at least one sub-unit per chronometer and a second stage, the first stage being configured to process time-of-flights (TOA' s) of each chronometer, the second stage being a control unit configured to compare the statistical results provided by said sub-units and being further configured provide properties of detected peaks that are detected by each of said sub-units.

12. The device according to claim 11, comprising
- a DPU consisting in an active sub-unit and a control-unit;
- a detector array wherein each detector is connected to a switch;
- a switch configured for connecting, for each selection of a pulse having a pseudo-randomly emitted wavelength, a corresponding detector to said active sub-unit, and configured to keep the other detectors of said detector array connected with the control sub-unit,
- the TOF system being configured for comparing the output from said active sub-unit with the output of the control sub-unit and distinguishing ghost distances from distances to said target.

13. The device according to claim 10 further comprising means for varying the pulse repetition rate (PRR) for every distance measurement.

14. The device according to claim 13 further comprising means for broadcasting via an independent channel randomly selected pulse repetition rates (PRR) to the other TOF systems of said multiple TOF systems.

15. The device according to claim 14 further comprising means for broadcasting via an independent channel at least two different pulse repetition rates (PRRs) to the other TOF systems of said multiple TOF systems.

16. The device according to claim 10 wherein the means for determining the distance from said statistical distribution of TOAs consists in means for determining the time of arrivals that appears most often in the distribution with respect to the randomly distributed noise contribution, said time of arrivals corresponding to the time of flight.

* * * * *